US012751349B2

(12) United States Patent
Steinke

(10) Patent No.: US 12,751,349 B2
(45) Date of Patent: Oct. 6, 2026

(54) GAUGE ARM

(71) Applicant: Jeffrey L. Steinke, Palisade, NE (US)

(72) Inventor: Jeffrey L. Steinke, Palisade, NE (US)

( * ) Notice: Subject to any disclaimer, the term of this patent is extended or adjusted under 35 U.S.C. 154(b) by 529 days.

(21) Appl. No.: 18/130,528

(22) Filed: Apr. 4, 2023

(65) Prior Publication Data

US 2023/0232730 A1 Jul. 27, 2023

Related U.S. Application Data

(63) Continuation of application No. 16/382,375, filed on Apr. 12, 2019, now abandoned.

(60) Provisional application No. 62/671,513, filed on May 15, 2018.

(51) Int. Cl.

*A01B 71/04* (2006.01)
*A01B 71/02* (2006.01)
*A01B 71/08* (2006.01)
*A01B 49/06* (2006.01)
*A01C 7/20* (2006.01)

(52) U.S. Cl.

CPC .............. *A01B 71/02* (2013.01); *A01B 71/04* (2013.01); *A01B 71/08* (2013.01); *A01B 49/06* (2013.01); *A01C 7/20* (2013.01)

(58) Field of Classification Search

CPC ......... A01B 49/06; A01B 71/02; A01B 71/04; A01B 71/08; A01C 5/064
See application file for complete search history.

(56) References Cited

U.S. PATENT DOCUMENTS

| | | | | |
|---|---|---|---|---|
| 2,327,962 A * | 8/1943 | Babbitt | F16N 7/40 | 184/6.12 |
| 4,700,808 A * | 10/1987 | Haentjens | F16C 33/6659 | 184/11.2 |
| 5,802,995 A * | 9/1998 | Baugher | A01C 7/205 | 111/140 |
| 6,468,028 B1 * | 10/2002 | Rockwood | F16N 7/366 | 415/58.4 |
| 2010/0292045 A1* | 11/2010 | Mori | F16H 13/02 | 476/67 |
| 2014/0312646 A1* | 10/2014 | Copp | B60J 10/246 | 296/100.12 |
| 2015/0230392 A1* | 8/2015 | Schafer | A01C 7/203 | 172/773 |
| 2016/0097423 A1* | 4/2016 | Hauck | F16C 25/083 | 384/570 |
| 2017/0156254 A1* | 6/2017 | Kester | A01C 5/068 | |

FOREIGN PATENT DOCUMENTS

| | | | |
|---|---|---|---|
| EP | 3300568 A1 * | 4/2018 | A01C 7/00 |
| EP | 4289245 A1 * | 12/2023 | A01C 5/068 |

* cited by examiner

*Primary Examiner* — Jamie L McGowan
(74) *Attorney, Agent, or Firm* — Pitts Lake, LLC

(57) ABSTRACT

A gauge arm (and concomitant method of retrofitting an existing gauge arm) comprising an arm portion, a receptacle portion for receiving two or more sealed bearings, and two or more sealed bearings inserted into the receptacle portion. The receptacle portion is smooth bore, with the sealed bearings being press fit into same. The sealed bearings can be of different dimensions, such as one being a gauge wheel and closing wheel bearing, and one a round bore grain drill bearing. The receptacle portion then comprises a stop within the bore thereof.

6 Claims, 6 Drawing Sheets

GAUGE ARM

CROSS-REFERENCE TO RELATED APPLICATIONS

This application claims priority to and the benefit of the filing of U.S. Non-Provisional patent application Ser. No. 16/328,375, filed on Apr. 12, 2019, which in turn claimed the benefit of U.S. Provisional Patent Application Ser. No. 62/671,513, filed on May 15, 2018, each of which is incorporated herein in its entirety by reference.

STATEMENT REGARDING FEDERALLY SPONSORED RESEARCH OR DEVELOPMENT

Not Applicable

BACKGROUND OF THE INVENTION

1. Field of the Invention (Technical Field)

The present invention relates to an improved gauge arm for farm equipment, most particularly for row crop planters.

2. Description of Related Art

Images of known gauge arms, also known as planter wheel gauge arms, 100, 102 are shown in FIGS. 1A and 1B (Prior Art), which are in this case manufactured by John Deere®. These known gauge arms, and others in the industry have a number of mechanical problems, The known gauge arms do not fit tightly even when new and get worn down quickly in typical dusty field conditions. The known gauge arms have a threaded insert or bushing 104, 106 that screws inside the gauge arm in threaded receptacle 108, 110, with no seal to keep out dust and dirt. The known gauge arms get loose and out of adjustment very easily. When they get loose, the result is that the tire that goes on the gauge arm then wears quickly. The prior art gauge arms also will get stuck and not move properly when they get full of dirt. This is a battle that, in particular, all row crop planters presently have.

The present invention provides an improved gauge arm that solves the above-noted problems and can be used either with original equipment manufacturing or can be used to retrofit existing gauge arms. The invention is also of a method for such retrofitting.

BRIEF SUMMARY OF THE INVENTION

The present invention is of a gauge arm comprising: an arm portion; a receptacle portion for receiving two or more sealed bearings; and two or more sealed bearings inserted into the receptacle portion. In the preferred embodiment, the receptacle portion is smooth bore, with the sealed bearings being press fit into the receptacle portion. The sealed bearings can be of different dimensions. One is preferably a gauge wheel and closing wheel bearing, and one a round bore grain drill bearing. The receptacle portion preferably comprises a stop within the bore of the receptacle portion.

The invention is also of a gauge arm comprising: an arm portion; and a receptacle portion for receiving two or more sealed bearings. In the preferred embodiment, the receptacle portion is smooth bore, with two or more sealed bearings being press fittable into the receptacle portion. The receptacle portion comprises a stop within the bore of the receptacle portion.

The invention is further of a method of retrofitting a gauge arm with a threaded receptacle portion, comprising: milling the receptacle portion to make it smooth bore; and inserting two or more sealed bearings into the milled receptacle portion. In the preferred embodiment, inserting comprises press fitting and two sealed bearing are inserted. One is preferably a gauge wheel and closing wheel bearing, and one a round bore grain drill bearing. Milling is done from both ends of the receptacle portion to form a stop within the bore of the receptacle portion.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1A:
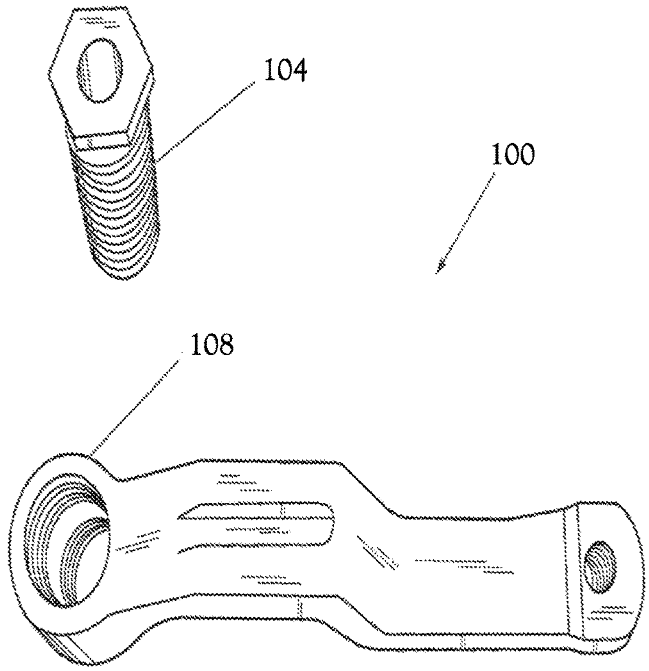
Fig.1A (PRIOR ART)
FIGS. 1A and 1B are exploded views of a prior art gauge arm.
Figure 1B:
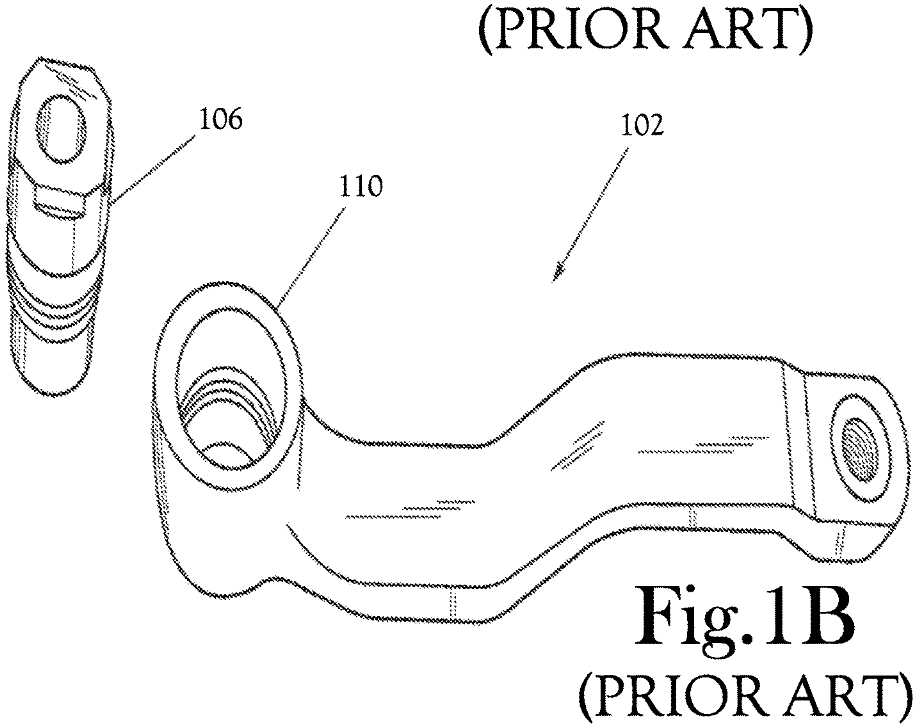
Fig.1B (PRIOR ART)
Figure 2:
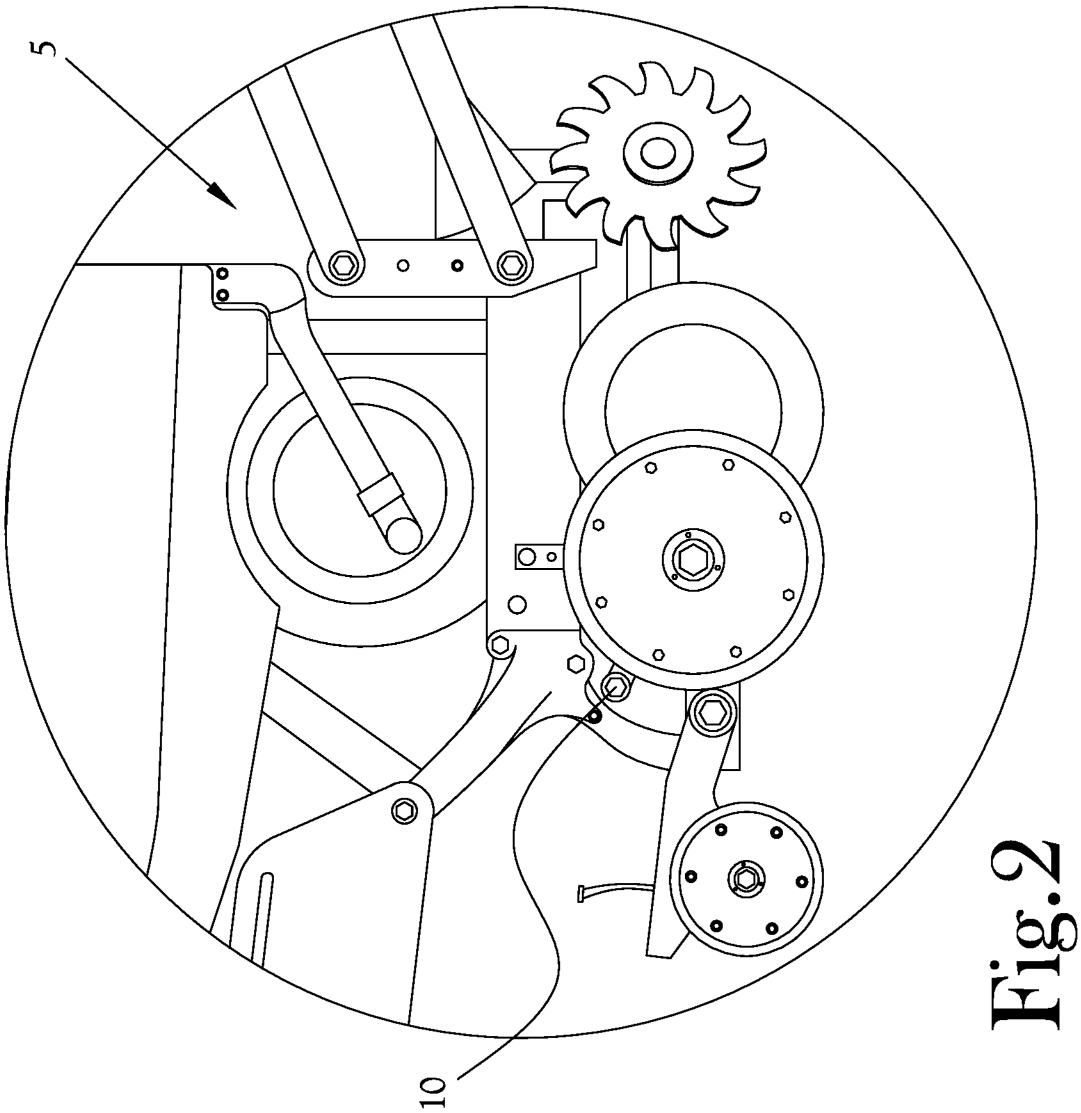
FIG. 2 is an elevation view of an improved gauge arm according to the present invention installed on a planter.
Figure 3:
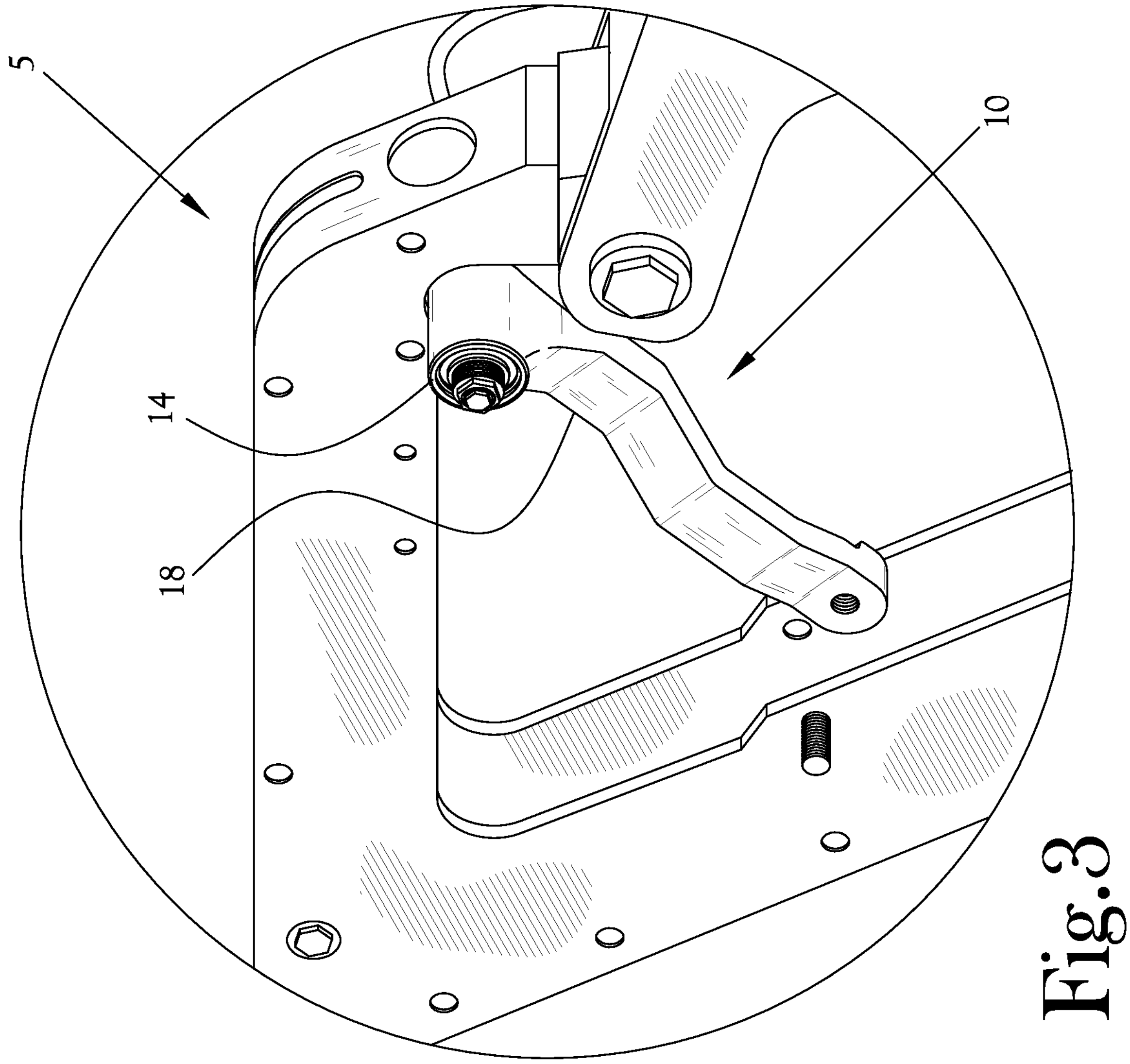
FIG. 3 is a perspective close up view of a portion of the planter shown in FIG. 2, with components removed for clarity of view, showing an installed improved gauge arm of the present invention.
Figure 4:
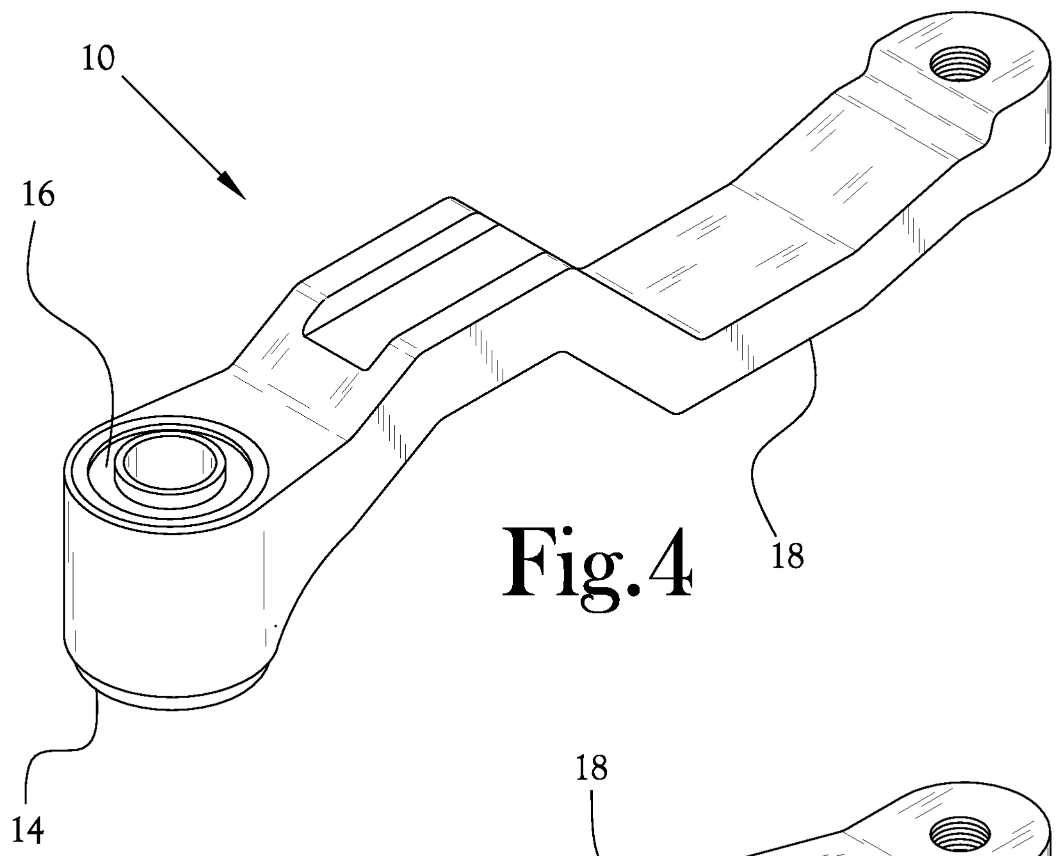
FIG. 4 is a back perspective view of an assembled gauge arm of the present invention.
Figure 5A:
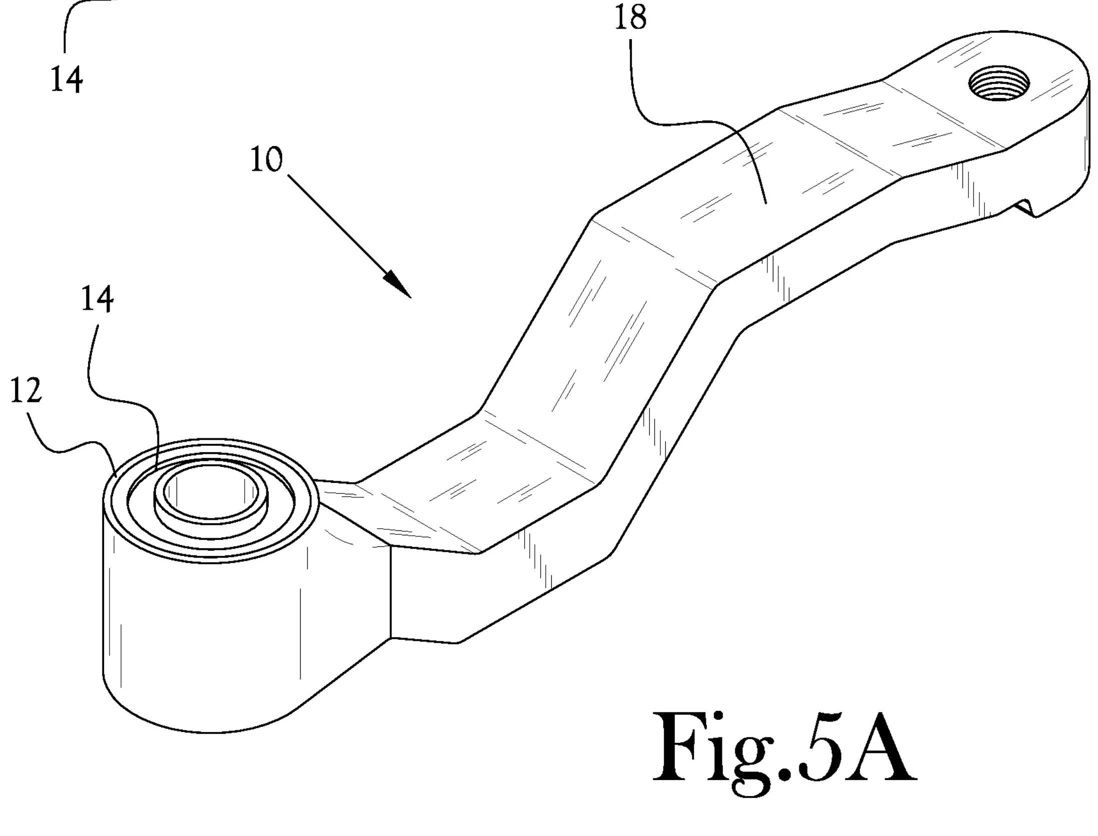
FIG. 5A is a front perspective view of an assembled gauge arm of the present invention.
Figure 5B:
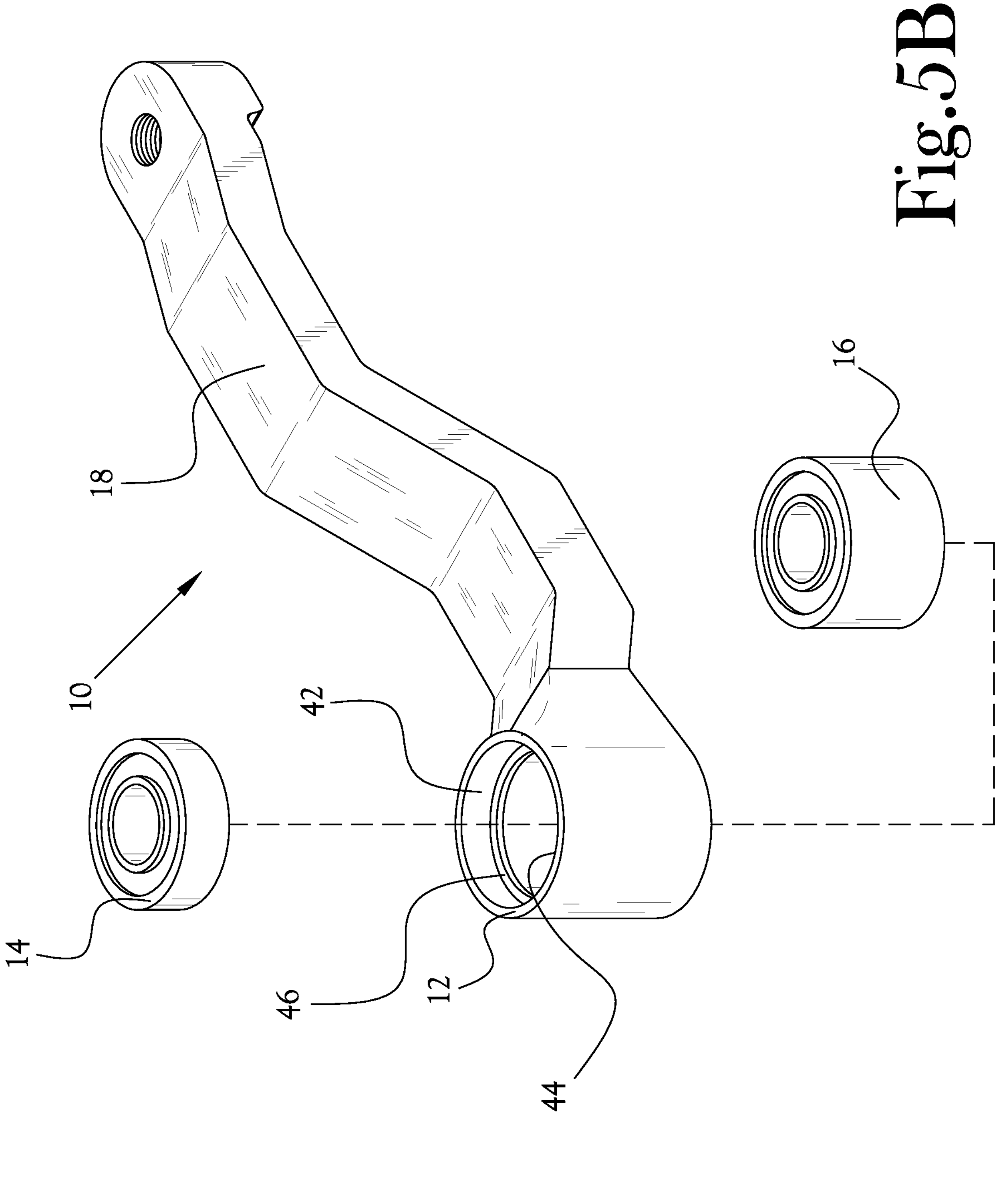
FIG. 5B is an exploded view of the gauge arm shown in FIG. 5A.
Figure 6A:
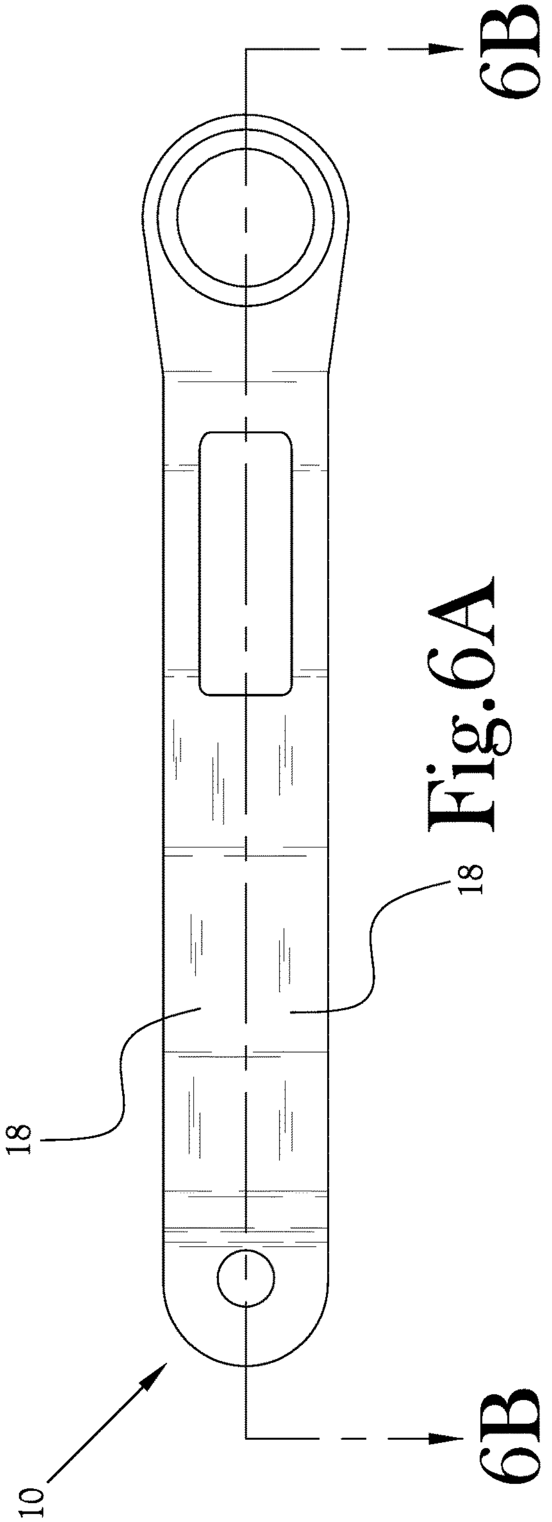
FIG. 6A is a plan view of the gauge arm of the present invention with the sealed bearings removed for clarity of view.
Figure 6B:
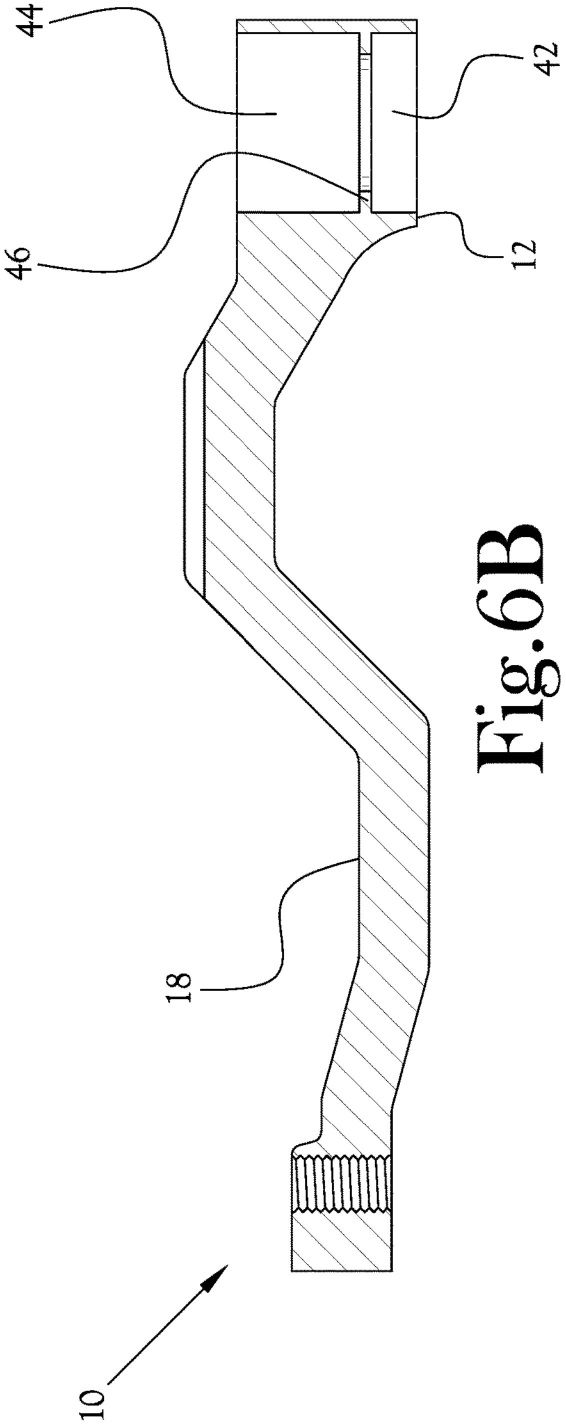
FIG. 6B is a cross-sectional view of the gauge arm illustrated in FIG. 6A taken at cut line 6B.

The present invention is of new improved gauge arms, which, as will be readily understood by those skilled in the art, are installed on planter machinery, such as planter 5 in FIGS. 2 and 3. In an exemplary embodiment, the gauge arms include a receptacle portion which is milled to take two or more (preferably two different) sealed bearings, with no threading required or desired. The gauge arms of the invention have sealed bearings so that they do not require greasing and will not in ordinary operation get full of dust or dirt. Furthermore, the bearings stay tight and in adjustment under normal use.

FIGS. 4-6B show an illustrative gauge arm 10 according to the invention as described herein. In this case the receptacle portion 12 of the gauge arm has been milled to accept two sealed bearings 14 and 16. Arm portion 18 can be of any of a number of shapes, depending on the requirements of the particular machine employing the gauge arm.

Receptacle portion 12 comprises receptacle 44 for bearing 14, receptacle 42 for bearing 16. Stops 46 are inserted where appropriate against which one end of each bearing will rest upon insertion. Receptacles 42 and 44 are preferably bored for press fit for the accompanying sealed bearings 14 and 16.

The preferred larger sealed bearing 14 is a gauge wheel and closing wheel bearing, most preferably with bore of about 0.640", overall length of about 1.725", length of body about 1.535", and width about 1.575", such as John Deere® part number AN212132 (or Timken® part number 5203KYY2). The preferred smaller sealed bearing 16 is a round bore grain drill bearing, most preferably with bore of about 0.64" round, O.D. of about 1.57" flat, IR width of about 0.72", and OR width of about 0.47", such as John Deere® part number AN281357 (or Timken® part number 203KRR2). Both the Single Row Bearing 203KRR2 and Double Row Bearing 5203KYY2 Type have been field tested for 9 years and proven to stay in place, work freely, and not need adjustment. However, other sealed bearings may be used as needs dictate, and could include two identical bearings.

The two above bearings are presently preferred for a few reasons. The AN212132 or equivalent bearing is a double row bearing. This type of bearing is very strong and field proven in other farm applications. The AN281357 or equivalent bearing is also field proven in farm applications. So, there are actually three rows of bearings inside the gauge arm that work together. The two different bearings together make a very strong set that can withstand a lot of side pressure while in motion. By using the two different bearings they collectively fill the inside cavity all the way across from one side to the other, making a good and secure fit when placed on the planter machinery such as planter 5. By leaving a stop inside the cavity of the gauge arm, these two different bearings, one on each side of the stop, work well together and cannot come out or move out of adjustment after being installed on the planter machinery. There are no snap rings or retainers necessary. In all, this embodiment of the present invention makes for a well working gauge arm that is nearly trouble free.

Note that in the specification and claims, "about" or "approximately" means within ten percent (10%) of the numerical amount cited.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

Having thus described the aforementioned present general inventive concept, what is claimed is:

1. A gauge arm comprising:

an arm portion;

an unthreaded receptacle portion;

a single interior stop within a bore of said unthreaded receptacle portion, wherein said unthreaded receptacle portion is adapted for receiving two sealed bearings of differing lengths, one on each side of said single interior stop;

a first sealed bearing inserted into said unthreaded receptacle portion and press fit against a first side of said single interior stop, wherein said first sealed bearing is a double row bearing;

a second sealed bearing inserted into said unthreaded receptacle portion and press fit against a second side of said single interior stop, wherein said gauge arm is suitable for use in a planter; and wherein said first sealed bearing and said second sealed bearing are in contact and collectively fill inside a cavity of said bore from one side to another side of said bore.

2. The gauge arm of claim 1 wherein said unthreaded receptacle portion is a smooth bore.

3. The gauge arm of claim 1 wherein said first sealed bearing and said second sealed bearing are of different dimensions.

4. The gauge arm of claim 1 wherein said first sealed bearing is a gauge wheel and closing wheel bearing.

5. The gauge arm of claim 4 wherein one of said second sealed bearing is a round bore grain drill bearing.

6. The gauge arm of claim 1 wherein the press fitting of said first sealed bearing and said second sealed bearing results in a secure frictional fit whereby no retainers such as snap rings are required to secure the first and second sealed bearings in said unthreaded receptacle portion.

* * * * *